US008200759B2

(12) United States Patent
Capiel

(10) Patent No.: US 8,200,759 B2
(45) Date of Patent: *Jun. 12, 2012

(54) METHOD AND SYSTEM FOR REMOTELY SENSING THE FILE FORMATS PROCESSED BY AN E-MAIL CLIENT

(75) Inventor: Gerardo J. Capiel, New York, NY (US)

(73) Assignee: Digital Impact, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/371,278

(22) Filed: Feb. 21, 2003

(65) Prior Publication Data
US 2003/0149733 A1 Aug. 7, 2003

Related U.S. Application Data

(63) Continuation of application No. 10/237,466, filed on Sep. 6, 2002, now Pat. No. 7,139,803, which is a continuation of application No. 09/240,096, filed on Jan. 29, 1999, now Pat. No. 6,449,634.

(51) Int. Cl.
G06F 15/16 (2006.01)
(52) U.S. Cl. ...... 709/206; 709/204; 709/207; 379/93.01
(58) Field of Classification Search .......... 709/206, 709/245, 203, 219, 205; 379/93.24; 345/618, 345/660; 717/174; 707/10
See application file for complete search history.

(56) References Cited

U.S. PATENT DOCUMENTS

| 5,426,594 A | * | 6/1995 | Wright et al. ............. 709/206 |
| 5,781,901 A | * | 7/1998 | Kuzma ....................... 1/1 |
| 5,790,790 A |   | 8/1998 | Smith et al. |
| 5,790,793 A |   | 8/1998 | Higley |
| 5,793,497 A |   | 8/1998 | Funk |
| 5,848,415 A | * | 12/1998 | Guck ........................ 707/10 |
| 5,911,776 A |   | 6/1999 | Guck |
| 5,961,590 A | * | 10/1999 | Mendez et al. ........... 709/206 |

(Continued)

FOREIGN PATENT DOCUMENTS

JP 020000 261493 9/2000

OTHER PUBLICATIONS

Civil Cover Sheet for case # C05 00990 BZ.

(Continued)

Primary Examiner — Thu Ha Nguyen
(74) Attorney, Agent, or Firm — Kilpatrick Townsend & Stockton LLP

(57) ABSTRACT

The present invention relates to the processing of E-mail messages over a telecommunications network. More particularly, the present invention relates to the detection and monitoring of file formats which can be processed and displayed at an E-mail client. Specific embodiments include, sending an E-mail message to the E-mail client, determining at the E-mail client a file format that the E-mail client can process and display, and indicating to the E-mail sensor server the file format that the E-mail client can process and display. Once the file format is determined, subsequent E-mail messages maybe of the same file format. The file format could be hyper text mark up language (HTML) statements or dynamic HTML(DHTML) statements or Java applets. The method may also include monitoring the status of the E-mail message received at the E-mail client.

58 Claims, 10 Drawing Sheets

U.S. PATENT DOCUMENTS

| | | | | |
|---|---|---|---|---|
| 5,973,696 | A | | 10/1999 | Agranat et al. |
| 5,974,441 | A | * | 10/1999 | Rogers et al. ................. 709/200 |
| 6,018,774 | A | * | 1/2000 | Mayle et al. .................. 709/250 |
| 6,092,114 | A | * | 7/2000 | Shaffer et al. ................. 709/232 |
| 6,134,582 | A | * | 10/2000 | Kennedy ....................... 709/206 |
| 6,178,442 | B1 | * | 1/2001 | Yamazaki ..................... 709/206 |
| 6,192,407 | B1 | * | 2/2001 | Smith et al. ................... 709/229 |
| 6,253,231 | B1 | * | 6/2001 | Fujii ............................. 709/206 |
| 6,314,454 | B1 | * | 11/2001 | Wang et al. .................... 709/206 |
| 6,327,612 | B1 | * | 12/2001 | Watanabe ..................... 709/206 |
| 6,360,254 | B1 | * | 3/2002 | Linden et al. ................. 709/219 |
| 6,449,634 | B1 | * | 9/2002 | Capiel ........................... 709/206 |
| 6,449,635 | B1 | | 9/2002 | Tilden, Jr. et al. |
| 6,505,233 | B1 | | 1/2003 | Hanson et al. |
| 6,529,956 | B1 | | 3/2003 | Smith et al. |
| 6,606,647 | B2 | * | 8/2003 | Shah et al. .................... 709/206 |
| 6,618,747 | B1 | * | 9/2003 | Flynn et al. ................... 709/206 |
| 6,779,178 | B1 | * | 8/2004 | Lloyd et al. ................... 717/174 |
| 6,795,711 | B1 | * | 9/2004 | Sivula ........................... 455/466 |
| 7,139,803 | B2 | | 11/2006 | Capiel |
| 2002/0019852 | A1 | * | 2/2002 | Bahar ........................... 709/206 |
| 2002/0083140 | A1 | * | 6/2002 | Shin et al. ..................... 709/206 |
| 2002/0099777 | A1 | * | 7/2002 | Gupta et al. .................. 709/206 |
| 2002/0120693 | A1 | * | 8/2002 | Rudd et al. .................... 709/206 |
| 2002/0143881 | A1 | * | 10/2002 | DeLaCruz .................... 709/206 |
| 2003/0009385 | A1 | * | 1/2003 | Tucciarone et al. ............ 705/26 |
| 2003/0120735 | A1 | * | 6/2003 | Capiel ........................... 709/206 |

OTHER PUBLICATIONS

Summons in a Civil Case to YesMail, Inc. for case # C05 00990 BZ.
Complaint for Patent Infringement filed by Digital Impact, case # C05 00990 BZ.
Order Setting Initial Case Management Conference for case # C 05-00990 BZ.
Report on the Filing or Determination of an Action Regarding a Patent or Trademark for case #CV-05-0990-BZ.
Docket report from Pacer Service Center for case # 3:05-cv-00990-BZ.
Civil Cover Sheet for case # C05 00636 BZ.
Summons In a Civil Case to Bigfoot Interactive, Inc. for case # C05 00636 BZ.
Complaint for Patent Infringement (filed by Digital Impact) dated Feb. 10, 2005 for case # C05 00636 BZ.
Order Setting Initial Case Management Conference, filed Feb. 10, 2005 for case # C 05-00636 BZ.
Docket report from Pacer Service Center for case # 3:05-cv-00636-BZ.
Report on the Filing or Determination of an Action Regarding a Patent or Trademark for case #CV-05-0636-BZ.
Joint Request for Reassignment to a United States District Judge for Trial and Disposition for case # C05-00636 BZ.
Notice of Impending Reassignment to a United States District Court Judge dated Mar. 9, 2005 for case # C05-0636 BZ.
Jurgen Van Gorp Email (from "emaildot.com") dated Oct. 29, 1996 from Google Groups, Email subject: "Important Industry News", downloaded from http://groups-beta.google.com/groups/news.admin.net-abuse.misc/browse_thread/thread/2642a6c14b731c...on Dec. 10, 2004.
Email from "Anonymous" dated Feb. 18, 1998 from Google Groups, Email subject: "I was auto-outed by an IMG tag in HTML spam", downloaded from http://groups.google.ie/groups?hl=en&lr=&ie=UTF-8&selm=e564f8f0ald6277679b117bc536e108%40anonymous. poster on Jul. 6, 2004.
Email from "Ben Williams" dated Dec. 31, 1997 from Google Groups, Email subject: "No strings or cost: Display our banner, get $10.00 for every sale!", downloaded from http://groups.google.ie/groups?hl=en&lr=&ie=UTF-8&safe=off&selm=34AA98D1.5F78%40blackbelt.c...on Dec. 10, 2004.
Civil Case Cover Sheet for case # C04 00734.
Complaint for Patent Infringement filed Feb. 23, 2004, case # C04 00734 (Digital Impact).
Answer to Complaint and Counterclaims (Responsys).
Reply to Counterclaims (Digital Impact).
Declaration of Michael C. Lee in Support of Responsys' Motion for Judgment on the Pleadings Pursuant to Rule 12(C), Fed. R. Civ. P.
Memorandum in Support of Responsys' Motion for Judgment on the Pleadings Pursuant to Rule 12(C), Fed. R. Civ. P.
Opposition to Responsys Motion for Judgment on the Pleadings (Digital Impact).
Responsys' Reply Memorandum in Support of Its Motion for Judgment on the Pleadings Pursuant to Rule 12(C), Fed. R. Civ. P.
Order Denying Defendant and Counterclaim Plaintiff's Motion for Judgment on the Pleadings.
Joint Case Management Statement and [Proposed Order] (Responsys).
Case Management Order (Digital Impact).
Expert Report of David H. Crocker.
Revised Expert Report of David H. Crocker.
Rebuttal Expert Report of David H. Crocker.
Plaintiff Digital Impact's Preliminary Claim Constructions and Extrinsic Evidence.
Responsys' Preliminary Claim Construction and Extrinsic Evidence for Claim Terms and Phrases Identified to Determine Whether the Claims of the '634 Patent Require Steps from Independent Parties.
Expert Report of Tom Paquin.
Rebuttal Expert Report of Tom Paquin in Response to Revised Expert Report of David H. Crocker.
Google Groups, Oct. 29, 1996 e-mail re: UCE Important Industry News, downloaded from http://groups.google.com/groups?selm=554imu$d9c@rcl.vub.ac.be&mum=1 on Jun. 22, 2004.
First Amended Complaint for Patent Infringement filed Mar. 30, 2005, Case No. C05 00990 BZ.
Declination to Proceed Before a Magistrate Judge and Request for Reassignment to a U.S. District Court Judge filed Apr. 7, 2005, Case No. C05 00990 BZ.
Notice of Impending Reassignment to a U.S. District Court Judge filed Apr. 11, 2005, Case No. C05 00990 BZ.
Reassignment Order issued Apr. 12, 2005, Case No. C05 00990 BZ.
Clerk's Notice (Scheduling Case Management Conference in Reassignment Case) issued Apr. 13, 2005, Case No. C05 00990 BZ.
Answer to First Amended Complaint for Patent Infringement; Counterclaim for Declaratory Relief filed Apr. 26, 2005, Case No. C05 00990 BZ.
Docket printed May 2, 2005 for Case No. C05 00990 BZ.
Reply to Counterclaims filed May 16, 2005, Case No. C05 00990 BZ.
Order re: Withdrawal of Attorney issued May 31, 2005, Case No. C05 00990 BZ.
Related Case Order issued Jun. 8, 2005, Case No. C05 00990 BZ.
Order Granting Motion for Pro Hac Vcie (Dresner) issued Apr. 6, 2005, Case No. C05 00636 BZ.
Answer to Complaint filed Apr. 14, 2005, Case No. C05 00636 BZ.
Reply to Counterclaims filed May 4, 2005, Case No. C05 00636 BZ.
Related Case Order issued Jun. 8, 2005, Case No. C05 00636 BZ.
Motion for Sanctions for Plaintiff's Failure to Withdraw or Amend Complaint, Jul. 15, 2005, Case No. C 05-00990 SBA.
Declaration of Hilts in Support of Motion for Sanctions for Plaintiff's Failure to Withdraw or Amend Complaint, Jul. 15, 2005, Case No. C 05-00990 SBA.
Declaration of Martiniak in Support of Motion for Sanctions for Plaintiff's Failure to Withdraw or Amend Complaint, Jul. 15, 2005, Case No. C 05-00990 SBA.
Original Summons with Proof of Service, Mar. 8, 2005, Case No. C05 00990 BZ.
Reassignment Order, Mar. 9, 2005, Case No. CV 05 00636 BZ.
Summons in a Civil Case, Feb. 10, 2005, Case No. C05 00636 BZ.
Stipulation and [Proposed] Order of Dismissal, Jan. 20, 2005, Case No. C 04 00734 SBA.
Original summons with Proof of Service, Feb. 23, 2004, Case No. C04 00734 SBA.
[Proposed] Order Granting Responsys' Motion for Judgment on Pleadings, Apr. 20, 2004, Case No. C 04 00734 SBA.
Notice of Motion and Motion for Judgment on Pleadings, Apr. 20, 2004, Case No. C 04 00734 SBA.

Stipulation Selecting ADR Process, ADR Certification, Jul. 14, 2004, Case No. C 04 00734 SBA.
Disclosure of Asserted Claims and Preliminary Infringement Contentions with chart of Claim Infringement, Aug. 6, 2004, Case No. C 04 00734 SBA.
Notice of Allowance for U.S. Appl. No. 10/237,466 mailed on May 24, 2006; 9 pages.
Notice of Allowance for U.S. Appl. No. 10/237,466 mailed on Oct. 11, 2005; pages.
Non-Final Office Action for or U.S. Appl. No. 10/237,466 mailed on Jun. 16, 2005; 18 pages.
Non-Final Office Action for or U.S. Appl. No. 10/237,466 mailed on Sep. 22, 2004; 10 pages.
Notice of Allowance for U.S. Appl. No. 09/240,096 mailed on Apr. 19, 2002; 5 pages.
Office Action for U.S. Appl. No. 09/240,096 mailed on Oct. 2, 2001; 11 pages.
Order dismissing appeal in Case No. 2008-1070 (signed by Circuit Judge Randall R. Rader on Feb. 7, 2008; 2 pages.
Brief of Appellant (Digital Impact) in Case Nos. 2008-1255, -1256; filed Aug. 21, 2008; 66 pages.
Brief of Defendant (Bigfoot Interactive) in Case Nos. 2008-1255, -1256; filed Oct. 2, 2008; 49 pages.
Reply brief of Appellant (Digital Impact) in Case Nos. 2008-1255, -1256; filed Nov. 14, 2008; 19 pages.
Order affirming judgment of district court in Case Nos. 2008-1255, -1256; ordered per Curiam by Circuit Judges (Lourie, Schall, and Gajarsa); entered Mar. 10, 2009; 1 page.
Petition for panel rehearing and rehearing en banc by Appellant (Digital Impact) in Case Nos. 2008-1255, -1256; filed Apr. 9, 2009; 20 pages.
Order denying the petition for panel rehearing and rehearing en banc; entered May 4, 2009; 2 pages.

* cited by examiner

320 — Dear Gerardo,

Tower is in the Holiday mood - come and join us!

We have gift ideas and boxed sets for every budget.

Here are some holiday hits to get you started:

Nat King Cole - The Christmas Song
Sale Price: $9.99 - You save: $2.00
-----------------------------------------------
Thanks for letting us contact you!

If you wish to UNSUBSCRIBE from future mailings, please go to:
http://tower.m0.net/m/u/t.asp?email=gcapiel%40digital-impact.tngi.com

FIG. 3A.

Wed., Jan 27 1999

PULSE! Magazine
Featured Listening
Trivia Games: Win $

Main
Home
Customer Service
Shopping Basket
Extended Search
Browse
Top 1000 on sale
CDs under $7

Departments
Video/DVD
New Releases
Advance Orders
Rock/Pop
Classical
Jazz
International
Blues
Dance/Electronica
Country
Latin
Soundtracks
Labels
Other Formats
Desert Island Discs
Tower Gift Cards Store Locator
Corporate
Tower Asia
Tower Europe

Order by Phone:
1-800-ASK-TOWER
Order by Fax:
1-800-538-6938
Shop AOL:
Keyword: Tower

*What would your Valentine like?*
candy? flowers? MUSIC!

▼Music  ▼Video  ▼Classical

Artist ▼ | Search | Classical Search
                    Video Search

| The '60s Soundtrack | Collective Soul Dosage | Varsity Blues Soundtrack | 1999 Grammy Nominees |
|---|---|---|---|
| ADD TO BASKET | ADD TO BASKET | ADD TO BASKET | ADD TO BASKET |
| $13.99 CD | $13.99 CD | $13.99 CD | $13.99 CD |

 Framed Miles
To celebrate the latest Miles Davis releases, The Complete Bitches Brew and Love Songs, we've got 6 framed Miles Davis prints! Enter today to win one for your very own!

 Love for Sale
Visit our Valentine Shop for a musical treat for your sweetheart this year! What better way to show you care than with a sweet tune?

 Tower's Top 100 for 1998
It's here, the Top 100 selling albums compiled from our 98 U.S. locations! See if your favorites for last year match up with our stores!.

 John Lee Hooker and B.B. King
When old friends get together to laugh and reminisce, it's beautiful.

 Looking for Italian Jazz
Italy has a good helping of straightahead jazz musicians, but this is something else.

Click Here For How-to-Order Information c 1996-1999 MTS, Inc./Tower Records
Send any questions or comments to feedback@towerrecords.com.
Thanks for shopping Tower!

Pricing at towerrecords.com applies for online purchases only.
Sale pricing may not apply in Tower retail stores.

*FIG. 3B.*

Dear Valued Customer,

Kick off 1999 with Tower Records!

Everything On Sale! January 14th-19th

Shop Tower's Super Clearance sale today for incredible savings on every CD, cassette, video and DVD title!

While at towerrecords.com, be sure to check out New Releases, sample thousands of new tracks in our Listening Station and play Trivia Blitz! for cash prizes!

Find a Tower Records location near you!

If you wish to unsubscribe from future mailings, please click here.

*FIG. 5A.*

METHOD AND SYSTEM FOR REMOTELY SENSING THE FILE FORMATS PROCESSED BY AN E-MAIL CLIENT

CROSS-REFERENCES TO RELATED APPLICATIONS

This application claims priority from and is a continuation of U.S. application Ser. No. 10/237,466 now U.S. Pat. No. 7,139,803 issued Nov. 21, 2006), filed Sep. 6, 2002, which in turn claims priority from and is a continuation of U.S. application Ser. No. 09/240,096, filed Jan. 29, 1999 (that issued as U.S. Pat. No. 6,449,634 B1 on Sep. 10, 2002). The entire disclosures of the above-mentioned applications are incorporated herein by reference for all purposes.

BACKGROUND OF THE INVENTION

The present invention relates to the processing of E-mail messages over a telecommunications network. More particularly, the present invention relates to the detection and monitoring of file formats which can be processed and displayed at an E-mail client. E-mail has become a major method of communicating information over telecommunication networks; this includes the "Internet" and intranets. There are estimates that about 30-55 million American homes are wired for E-mail communication today, and this number is rapidly growing. This provides a large audience for E-mail advertisers. Thus, through E-mail, vendors can make millions of customers aware of their products. One method is to reach the largest audience possible. However, blanket advertising is akin to junk mail and is ineffective in terms of actual sales.

Targeting advertising to customer profiles has been a method to improve E-mail sales. The challenge has been to identify the audience and tailor the advertising to that audience. Vendor lists of prior customers provide a basis to identify the target audience. Once the customer base is determined, the format of the advertisement is another important factor in increasing sales. Certain sections of the population respond favorably to visual media, e.g., graphics over pure text. This "visual media" group is several times more likely to respond when they receive visual images, then when they receive only pure text. As this "visual media" group represents a significant portion of the E-mail consumers, it is one group to focus on.

Blanket advertising using visual images instead of only text is still ineffective. As the sender, chooses the file format, what the receiver, i.e., user, can process and display may be incompatible. Thus many users, to include members of the "visual media" group, may display the visual images as illegible characters. Thus there is a need to insure the user gets the file format that he/she can display.

BRIEF SUMMARY OF THE INVENTION

The present invention describes a method and system for analyzing an E-mail client by an E-mail sensor server. The E-mail client may be, for example, the home personal computer and E-mail client software, Netscape Mail, which a person uses to access his/her E-mail. The E-mail sensor server may be, for example, a merchant's Windows NT server. One goal is to develop a customer base which receives visual advertisements targeted to their interests and that respond by buying the advertised products. The present invention detects through an E-mail sensor message, the file format that an E-mail client can process and display. Thus, those E-mail clients that can display images can receive compatible visual image advertisements and those that cannot receive text. The invention in addition tracks the responses of the E-mail clients to further refine the "visual media" group that responds positively to targeted advertisements with images. Another advantage of the invention is that the invention works with most commercially available E-mail client software, e.g., Qualcomm's Eudora, Novell's Groupwise, Microsoft Out-Look/Exchange and Netscape's E-mail client, and hence there is typically no need for users to purchase special software.

Specific embodiments of the method of the present invention include, sending an E-mail message to the E-mail client; determining at the E-mail client a file format that the E-mail client can process and display and indicating to the E-mail sensor server the file format that the E-mail client can process and display. In one specific embodiment, the E-mail sensor server may only determine if a particular file format can be processed and displayed at the E-mail client, and not if it cannot be processed and displayed at the E-mail client. The processing may further determine if hyper text mark up language (HTML) statements or dynamic HTML(DHTML) statements or Java applets can be executed by the E-mail client. Specific embodiments may include the E-mail client executing an HTML image tag having a call to an E-mail server sensor program. The E-mail server sensor program may save information about the E-mail client, such as the E-mail client software type, to an E-mail sensor server database. These embodiments may also include monitoring the status of the E-mail message received at the E-mail client.

These and other embodiments of the present invention, as well as its advantages and features, are described in more detail in conjunction with the text below and the attached figures.

BRIEF DESCRIPTION OF THE DRAWINGS

FIG. 3A shows a simplified display of an E-mail sensor message;

FIG. 3B shows the visual images that results by the user "clicking" on a hyperlink in FIG. 3A;

FIG. 5A shows an example of a display of the second E-mail sensor message;

DETAILED DESCRIPTION OF THE INVENTION

Specific embodiments of the present invention provide a method and system for determining at the E-mail sensor server, the file format that an E-mail client can display. If the file format allows visual images to be displayed, then the E-mail sensor server may update its sensor database and may send subsequent files of the same format to the E-mail client. In addition, the E-mail client may send to the E-mail sensor server, the type and version of the E-mail client software and status information on the opening and re-openings of the E-mail sensor message. If visual images cannot be displayed, the E-mail sensor server may send only textual messages to the client.

E-Mail Sensor System

Figure 1:
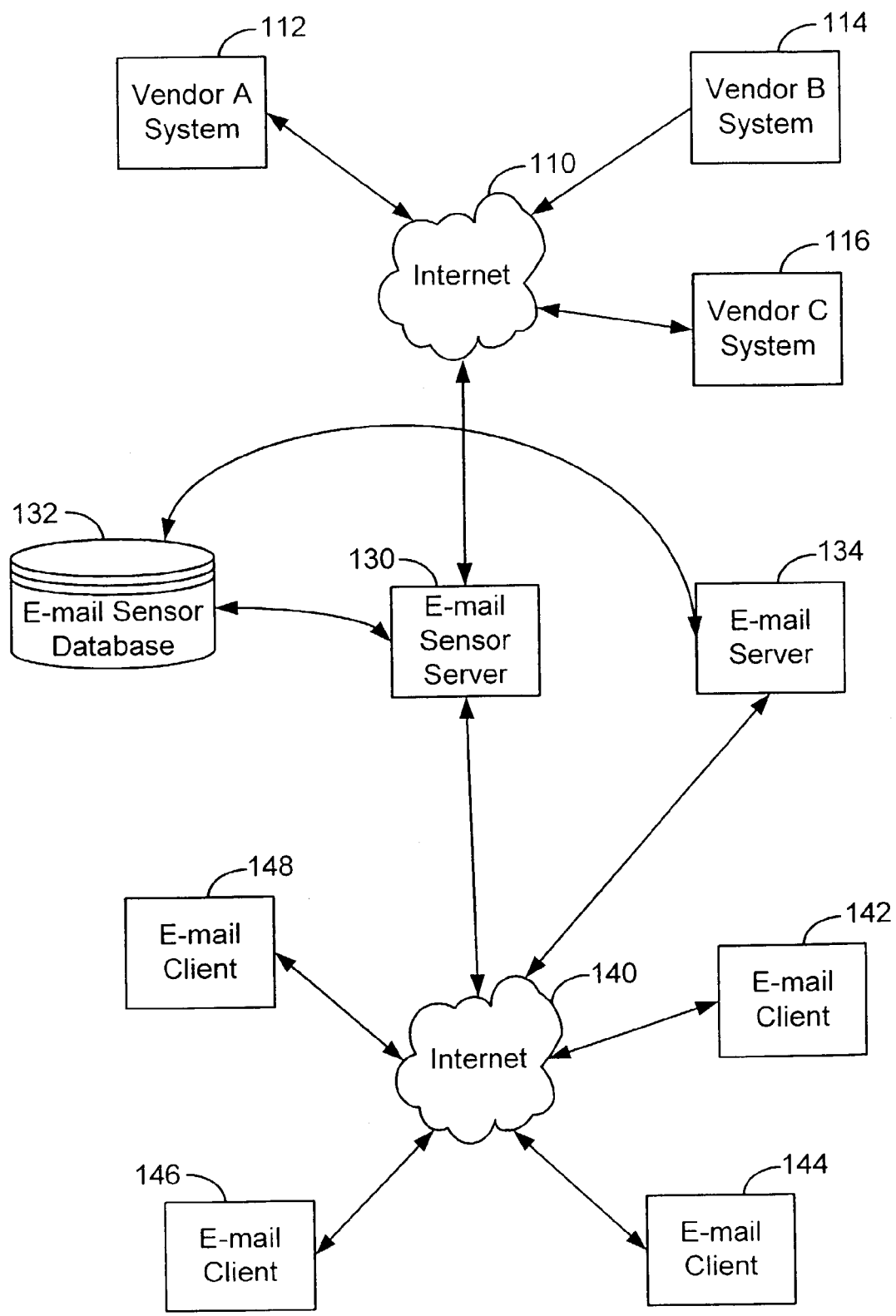
FIG. 1 shows a simplified representation of the E-mail sensor system of the present invention.

FIG. 1 shows a simplified representation of the E-mail sensor system of the present invention. The E-mail sensor server 130 is connected both to the vendor systems through Internet 110 and to the E-mail clients through Internet 140. Internet 110 and Internet 140 belong to the same global Internet and are separated only for convenience of illustration. The E-mail sensor server 130, runs the sensor server program which communicates with the E-mail sensor database 132. E-mail server 134 is an additional server which sends E-mail to and receives E-mail from the E-mail clients. E-mail server 134 is also connected to the E-mail sensor database 132. In another embodiment E-mail server 134 and E-mail sensor server 130 may run on one computer. Internet 110 connects several vendor systems, for example vendor A system 112, vendor B system 114, and vendor C system 115, to the E-mail sensor server 130. Internet 140 connects several E-mail clients, for example E-mail clients 142, 144, 146, and 148, to the E-mail sensor server 130 and Email server 134. Thus the E-mail sensor server 130 serves as a middleman information collection point between the vendor systems 112, 114, 116 and the E-mail clients 142, 144, 146, 148. This information is stored by the E-mail sensor server 130 in its E-mail sensor database 132.

In a specific embodiment of the present invention, the vendor's 112, 114, and 116 may have their own hypertext markup language (HTML) documents which include visual images. The vendor may for example, have his own World Wide Web home site with the site's web pages containing these HTML documents. Vendor A 112, for example, would then pass it's HTML document information along with its E-mail client customer list through internet 110, to the E-mail sensor server 130 which would then store the information in the E-mail sensor database 132. The E-mail server 134 would access the database 132 and include Vendor A's HTML information in the E-mail sensors sent out to all E-mail clients listed on Vendor A's customer list. For illustration, let this be E-mail clients 142 and 144. If E-mail client 142 can process and execute HTML statements, E-mail client 142 will send a response back to E-mail sensor server 130. In a specific embodiment, the response is implemented by the E-mail client software executing a HTML "image tag" statement which calls a program on the E-mail sensor server. The E-mail sensor server may then update its E-mail sensor database 132.

The E-mail client display includes any hyperlinks to Vendor's A HTML document and any visual images that are the result of executing the HTML statements. For example, an E-mail client by "clicking" on a HTML hyperlink displayed at the E-mail client's computer could then display a vendor's Web page (This is later shown in FIGS. 3A and 3B). Future E-mail messages to E-mail client 142 from E-mail sensor server 130 may contain HTML content including visual images and hyperlink's back to Vendor A. The hyperlinks to Vendor A are all channeled through E-mail sensor server 130. If, for example, E-mail client 144 cannot process and execute HTML, but only text, then E-mail client 144 may display only the textual information included in the E-mail sensor. Future E-mail messages sent to E-mail client 144 may contain only textual information.

In other alternative embodiments, the information transferred between vendor's 112, 114, 116, E-mail sensor server 130 and E-mail clients 142, 144, 146, 148 may include dynamic hypertext mark up (DHTML) statements and/or Java applets. DHTML is a combination of HTML style sheets and scripts that allows documents to be animated. In these alternative embodiments an E-mail sensor server program may be called by the E-mail client executing a HTML "image tag" statement, in the case of DHTML, or by the E-mail client executing a Java applet triggered by the E-mail sensor message. The E-mail sensor server program would also receive the E-mail client's software type and version from the E-mail client. This information could be used to tailor the type and version of DHTML and Java that the E-mail client can process and display.

Figure 2:
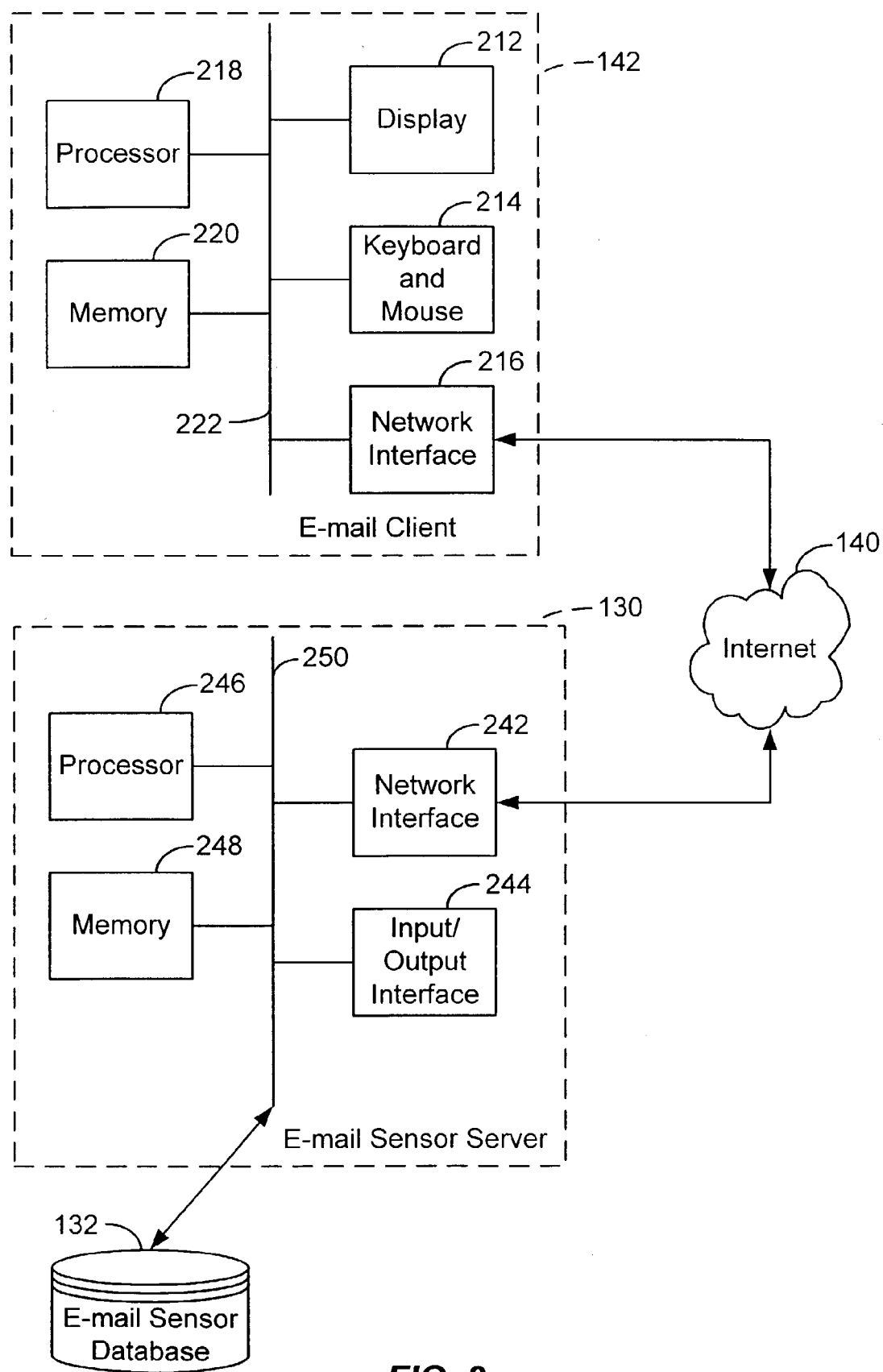
FIG. 2 illustrates a simplified block diagram of one specific connection of a specific embodiment of the present invention.

FIG. 2 illustrates a simplified block diagram of one specific connection of a specific embodiment of the present invention. FIG. 2 shows a connection between the E-mail sensor server 130 and the E-mail sensor database 132 through the Internet 140 to one of the E-mail clients 142. The E-mail sensor server includes a processor 246, a memory 248, a network interface 242, and an input/output interface 244. These are all connected together through internal bus 250. The processor 246 may contain one or more central processing units (CPU), for example a Pentium II, a Motorola 68000 or a UltraSparc processor. The memory includes both volatile memory, for example, RAM, and nonvolatile memory, for example, hard disk, and ROM. The input/output interface may include a CRT display, keyboard, and mouse. The network interface 242 connects the E-mail sensor server 130 to the Internet 140 and may include, for example, a modem or an Ethernet card. The E-mail sensor server 130 is connected through connection 252 to its E-mail sensor database 132. The E-mail sensor database 132 includes information on the E-mail client profile, E-mail client software type and version, whether or not the E-mail client can process and display HTML, and the E-mail client's message status. The sensor database may be a relational SQL database implemented for example on a personal computer or on a UNIX server. Not shown is the E-mail server 134 which has hardware similar to the E-mail sensor server 130. This is a typical E-mail server 134 with E-mail server software customized to append a unique HTML image tag. The E-mail server is connected to database 132 and Internet 140.

One specific embodiment of the E-mail client 142 shows a processor 218, memory 220, a display 212, a keyboard and mouse 214, and a network interface 216 connected together through an internal bus 222. The network interface 216, which may for example be a modem, connects the E-mail client 142 to the Internet 140. The processor 218 may, for example, be a Pentium II. The memory 220 includes both volatile memory, for example RAM, and nonvolatile memory, for example, a hard disk. Thus in this specific embodiment the E-mail client 142 can be represented by a personal computer with a Pentium processor 218 which executes E-mail client software stored in 220. Examples of E-mail client software are Qualcomm's Eudora, Novell's Groupwise, Microsoft OutLook/Exchange and Netscape's E-mail client.

E-Mail Sensor

Figure 3:
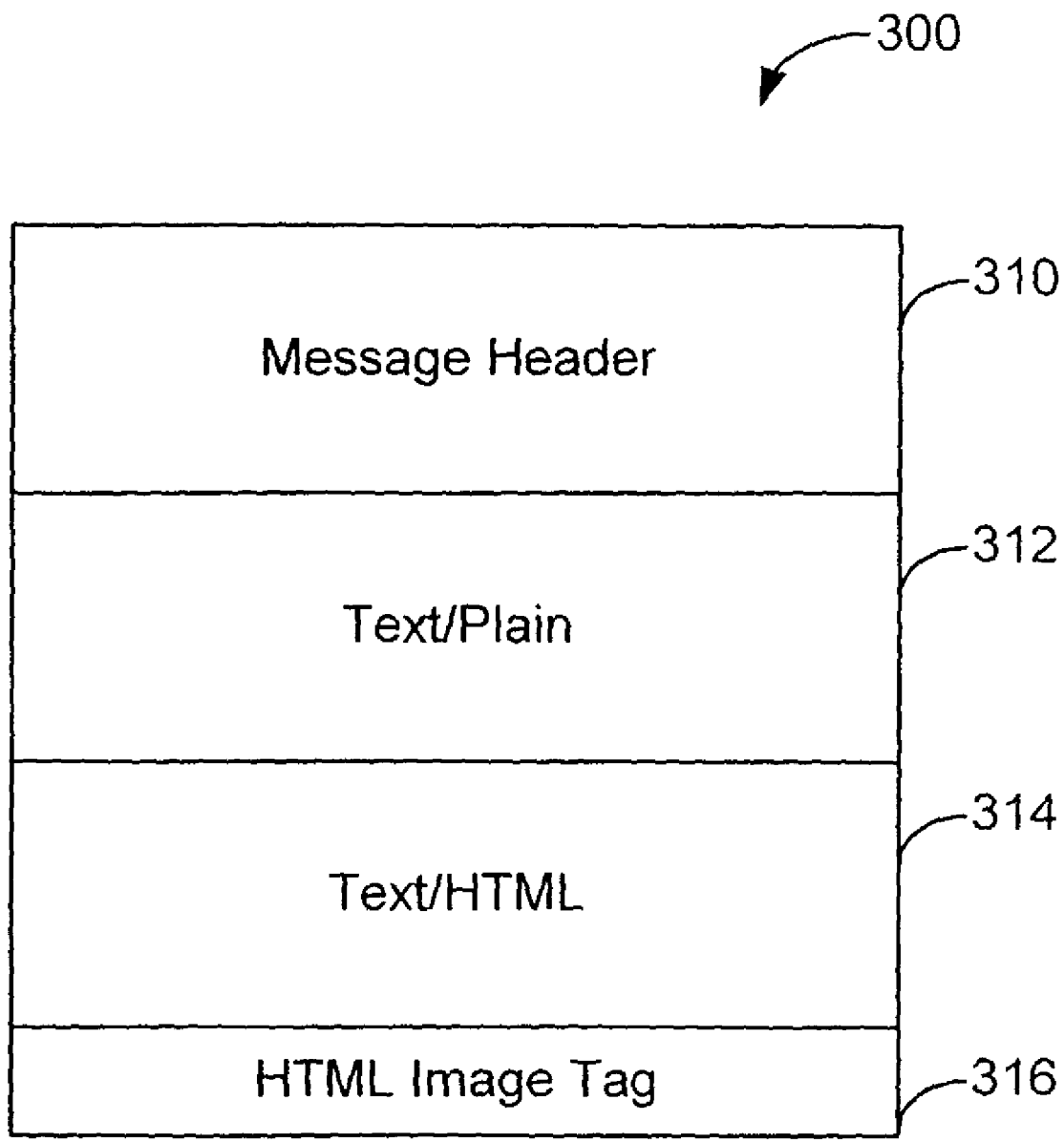
FIG. 3 shows a specific embodiment of the E-mail sensor format.

FIG. 3 shows a specific embodiment of the E-mail sensor format 300. This format 300 represents an E-mail message which is sent from the E-mail server 134 through the Internet 140 to the E-mail client 142. The E-mail sensor format 300 includes an E-mail message header 310, a section of plain text 312, a section of text in HTML 314, and an HTML image tag 316. For example, FIG. 3A shows a simplified display of an E-mail sensor message that a user may view at his/her Netscape E-mail client on his/her home PC. FIG. 3B shows the visual images that results by the user "clicking" on the "Tower" hyperlink 320 to the Tower Records home page.

Figure 4:
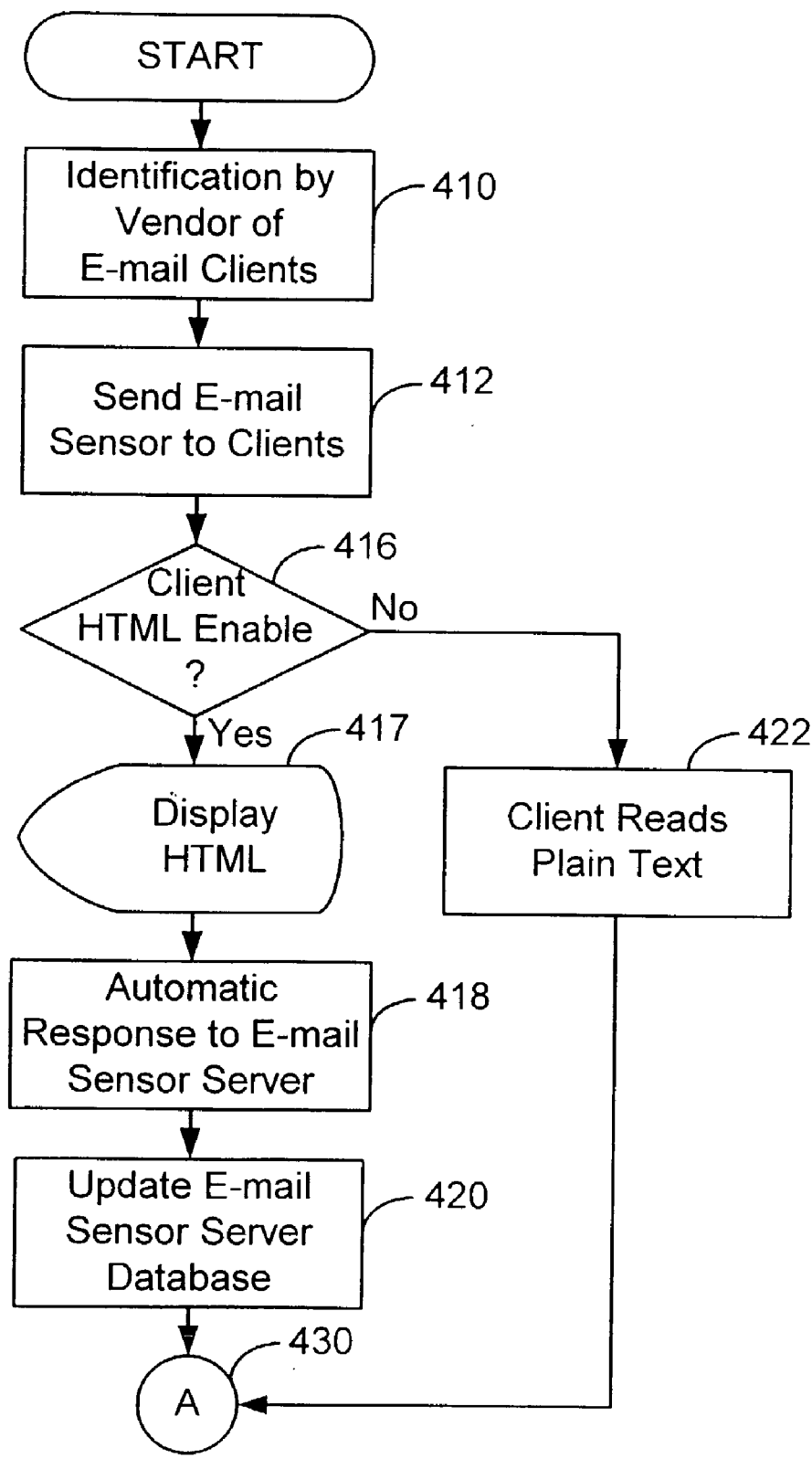
FIG. 4 illustrates the process by which an E-mail sensor message is sent to the E-mail client.

FIG. 4 illustrate the process by which an E-mail sensor is sent to the E-mail clients. In FIG. 4 the vendor identifies a list of its E-mail clients (step 410). These E-mail clients are stored in the E-mail sensor database 132. The E-mail server 134 then sends an E-mail sensor message 300 to the E-mail clients (step 412). The E-mail sensor message 300 is processed at the E-mail client by hardware similar to E-mail client processor 218 using E-mail client software stored in its memory 220. The E-mail client software determines if it can process and display HTML (step 416). If the client is HTML enabled (step 416) then the plain text part 312 is ignored and the HTML part 314 is displayed at the E-mail client 142 (step 417). In addition, if the client is HTML enabled (step 416), then an automatic response is sent to the E-mail sensor server 130 (step 418). This response is accomplished by the E-mail client software executing the HTML image tag 316. This image tag is a call to a E-mail sensor server program described below. The E-mail client also passes to the sensor server program information, such as the type and version of the E-mail client's software. At step 420 the E-mail sensor server 130 updates its sensor database 132 with the retrieved information. The next step 430 is to go to node A and will be described with respect to FIG. 6.

If the client is not HTML enabled (step 416) then the client reads the plain text (step 422) and goes to node A (step 430). The HTML part 314 and the HTML image tag 316 may appear as unreadable marks at the end of the text part 312. The amount and complexity of the HTML sent in this first Email sensor message is kept small and simple to reduce the unreadable marks. see FIG. 3A). The E-mail sensor message in this specific embodiment only determines if the E-mail client can process and display HTML and does not determine if only pure text can be processed and displayed. Thus the E-mail sensor server does not get an automatic response telling it that the E-mail client cannot process and display HTML.

Figure 6:
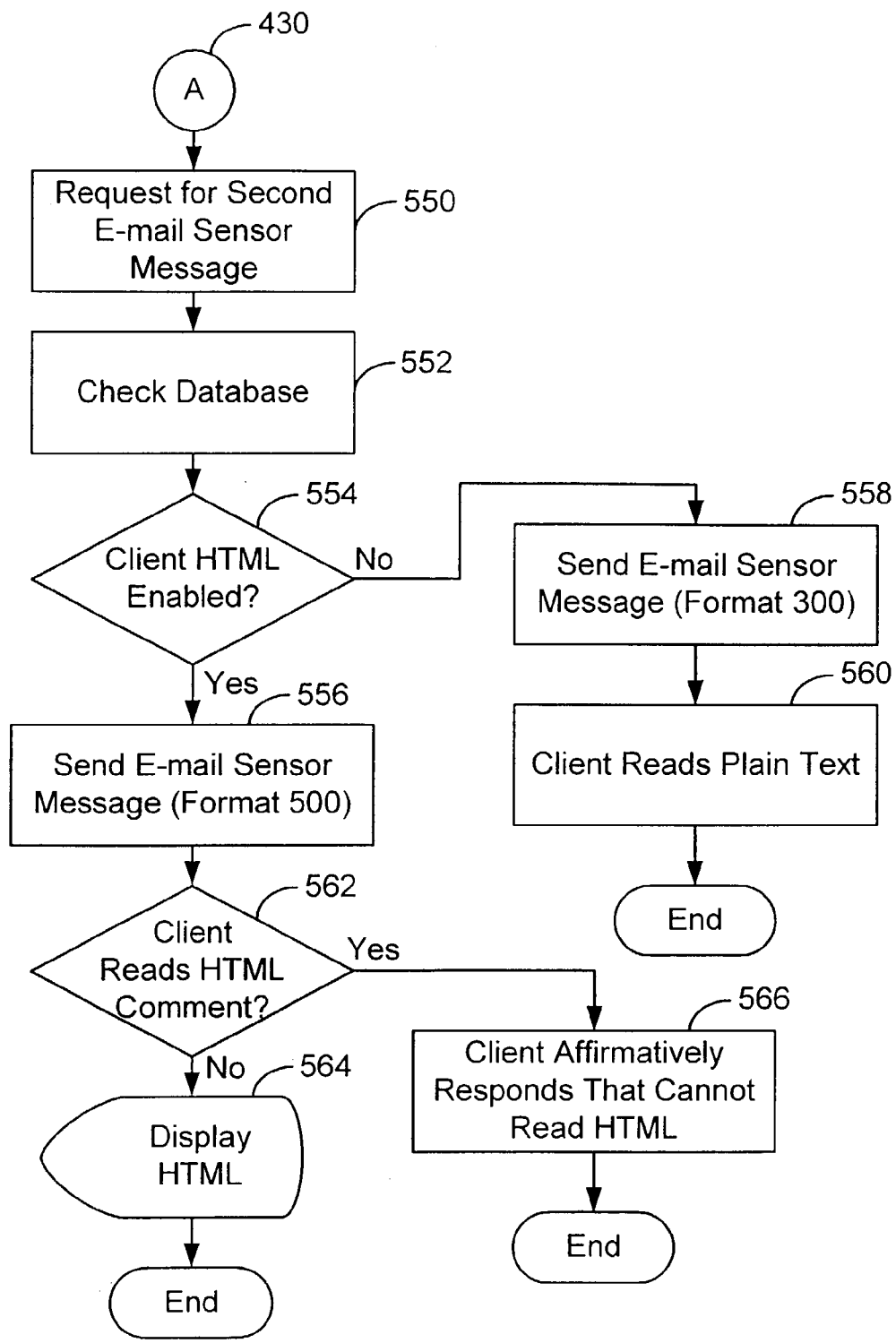
FIG. 6 shows a specific embodiment of the present invention of sending a second E-mail sensor message to the E-mail client.

Not shown in FIG. 4 or FIG. 6 is that the client is typically given the opportunity through a line of text in the message to unsubscribe from the service. If the client decides to unsubscribe then all further service may be stopped. This line that allows the client to unsubscribe may be present in all E-mail messages sent to the client.

A specific example of the E-mail sensor message of the format of FIG. 3 sent to the E-mail client 142 by the E-mail server 134 is given below:

---

Return-Path: <Vendor@appl.merchantmail.net>
Received: from app4.merchantmail.net (app4.merchantmail.net [206.79.71.110])
    by ws10.digital-impact.tngi.com (8.8.7/8.8.7) with SMTP id WAA29568
    for <gcapiel@digital-impact.tngi.com>; Mon, 30 Nov 1998 22:41:51 -0800
Date: Mon, 30 Nov 1998 22:41:51 -0800
Message-Id: <199812010641 .WAA29568@ws10.digital-impact.tngi.com>
From: Vendor <Vendor@merchantmail.net>
Reply-to: Vendor <Vendor@merchantmail.net>
To: gcapiel@digital-impact.tngi.com
Mime-version: 1.0
Subject: Holiday Music From Vendorrecords.com
Errors-to: Vendor@appl.merchantmail.net
Content-type: multipart/alternative;
boundary="141511991.912494616853.root@app6.merchantmail.net"
X-cid: 10424522
Status:
--141511991.912494616853.root@app6.merchantmail.net
Content-Type: text/plain
Dear Gerardo,
Vendor is in the Holiday mood - come and join us!
http://Vendor.m0.net/m/s.asp?H10424522X17652
We have gift ideas and boxed sets for every budget.
http://Vendor.m0.net/m/s.asp?H10424522X17690
Here are some holiday hits to get you started:
Nat King Cole - The Christmas Song
 Sale Price: $9.99 - You save: $2.00 
For more info: http://Vendor.m0.net/m/s.asp?H10424522X17653
------------------------------------------------------
Thanks for letting us contact you!
If you wish to UNSUBSCRIBE from future mailings, please go to:
http://Vendor.m0.net/m/u/t.asp?E-mail=gcapiel%40digital-impact.tngi.com.
--141511991.912494616853.root@app6.merchantmail.net
Content-Type: text/html
<HTML><BODY>
Dear Gerardo, <BR>
<BR>
<a href="http://Vendor.m0.net/m/s.asp?H10424522X17651">Vendor</a> is in the <a
href="http://Vendor.m0.net/m/s.asp?H10424522X17652">Holiday mood</a> - come and join
us!<BR>
<BR>
We have <a href="http://Vendor.m0.net/m/s.asp?H1110424522X17690">gift ideas</a> and <a
href="http://Vendor.m0.net/m/s.asp?H10424522X17691">boxed sets</a> for every
budget.<BR>
<BR>
Here are some holiday hits to get you started: <BR>
<BR>
<a href="http://Vendor.m0.net/m/s.asp?H10424522X17653">Nat King Cole - The Christmas
Song</a><BR>
 Sale Price: $9.99 - You save: $2.00 <BR>
------------------------------------------------------<BR>

-continued

```
Thanks for letting us contact you! <BR>
<BR>
If you wish to UNSUBSCRIBE from future mailings, please go to: <BR>
<a href="http://Vendor.m0.net/m/u/t.asp?E-mail=gcapiel%40digital-
impact.tngi.com">http://Vendor.m0.net/m/u/t.asp?E-mail=gcapiel%40digital-
impact.tngi.com</a>. <BR>
<BR><BR>
<img width='1' height='1' src="http://Vendor.m0.net/mm/logopen02.asp?catid=10424522&E-
mail=gcapiel@digital-impact.tngi.com" alt=" ">
<BR></BODY></HTML>
--141511991.912494616853.root@app6.merchantmail.net--
```

The example above shows a multi-purpose internet mail extensions (MIME) E-mail message having four parts. The HTML displayed at the E-mail client is shown in FIG. 3A. The first part between "Return-Path" and "Status" is part of the E-mail message header 310. The "boundary" text line is: "--141511991.912494616853.root@app6.merchantmail.net." and the first "boundary" text line is between the message header and the second part 312. In the first part 310, the MIME version is given: "MIME_version: 1.0." MIME allows the E-mail sensor server to send a variety of data types using E-mail, including sound files, picture files, textual data, video files, and messages consisting of multiple parts. Both the E-mail server 134 and E-mail clients, 142, 144, 146, and 148, should have MIME compliant E-mail software. Most commercial E-mail client software packages are MIME compliant. In this specific example, both the E-mail server 134 and E-mail client 142 have MIME compliant E-mail software used to process the E-mail messages. The content-type "multipart/alternative" means that if the E-mail client 142 can process and display HTML, then the third part 314 and fourth part 316 of E-mail message format 300 will be executed and displayed and the second part 312 is ignored. If the E-mail client 142 cannot process and display HTML, then the second part 312 is displayed as human readable textual information and the third 314 and fourth 316 parts maybe displayed and maybe unreadable.

The second 312 and third 314 parts are also separated by the same "boundary" text line and both contain the same content. The second part 312 in the above E-mail sensor message example starts with "Content-Type: text/plain", and ends with the "boundary" text line. The second part 312 contains ASCII text which can be displayed by most E-mail clients. The third part 314 starts with "Content-Type: text/html" and ends with the line before "<img width='1' height='1'". The third part 314 is the HTML version of the second part 312 with additions to include HTML hyperlinks to vendor documents and visual images.

The fourth part 316 includes a HTML image tag that has the following format:

```
<img width='1' heights='1'
src="http://sensorserver.domain.com/sensorserverprogram?
catid=uniqueEmailcode&email=emailaddress">
```

The line <img width='1' height='1'" is a small image square that is displayed by the E-mail client 142 near the end of the E-mail sensor server's 130, execution of the "sensor server program" given in the above HTML line beginning with "src=". The E-mail sensor sever program, in the example E-mail sensor message shown above is "mm/logopen 02.asp".

The E-mail address of each recipient, i.e., "email=," is included as a parameter in the above HTML "src=" statement along with a unique E-mail code, i.e., "catid=", that is unique to every E-mail delivered. In the E-mail sensor message example given above, email=gcapiel@digital-impact.com, which represents, in this example, the Internet address of E-mail client 142, and catid=10424522, which represents the unique identifier assigned to this E-mail sensor message. When multiple messages are sent to the same recipient, the unique E-mail code will change to identify different messages. In an alternative DHTML embodiment the HTML image tag would still be present. Since the image tag passes to the E-mail sensor server the type and version of the E-mail client software, the type and version of DHTML that can be processed by the E-mail client can be determined. Thus the correct type and version of DHTML can be sent to the E-mail client.

In another alternative embodiment of the HTML image tag shown above, the E-mail sensor message may include a Java-related tag in place of the HTML image tag. This Java "object" tag in the HTML document specifies the applet to be run on the E-mail client 142. When the HTML document is executed on the E-mail client, the Java "object" tag is executed and the applet is downloaded from the Uniform Resource Locator (URL) specified in the tag, for example, the E-mail sensor server 130. The applet is executed and a connection is established back to the E-mail sensor server 130. The E-mail client software type, i.e., "browserType", and E-mail address, i.e., "urlInfo", is sent from the E-mail client to the E-mail sensor server. An example applet follows:

```
import java.applet.*;
import java.awt.*;
import java.net.*;
import java.util.*;
import java.io.*;
public class MailSensor extends Applet
{
        static public void main (String argv[ ])
    {
            new MailSensor ( );
    }
        public void MailSensor ( )
    {
            String urlInfo = this.getParameter ("urlInfo");
            String browserType = this.getParameter ("browserType");
            urlInfo = urlInfo + "&browserType=" + browserType;
        try {
            URL url =new URL (urlInfo);
            try {
                    url getContent ( )
            }
            catch (IOException e) { ; }
        }
        catch (MalformedURLException e2) { ; }
        }
}
```

Other alternative embodiments which perform the same functions as the Java applet or HTML image tag could be written in Active X, VBscripts, or JavaScript.

Figure 5:
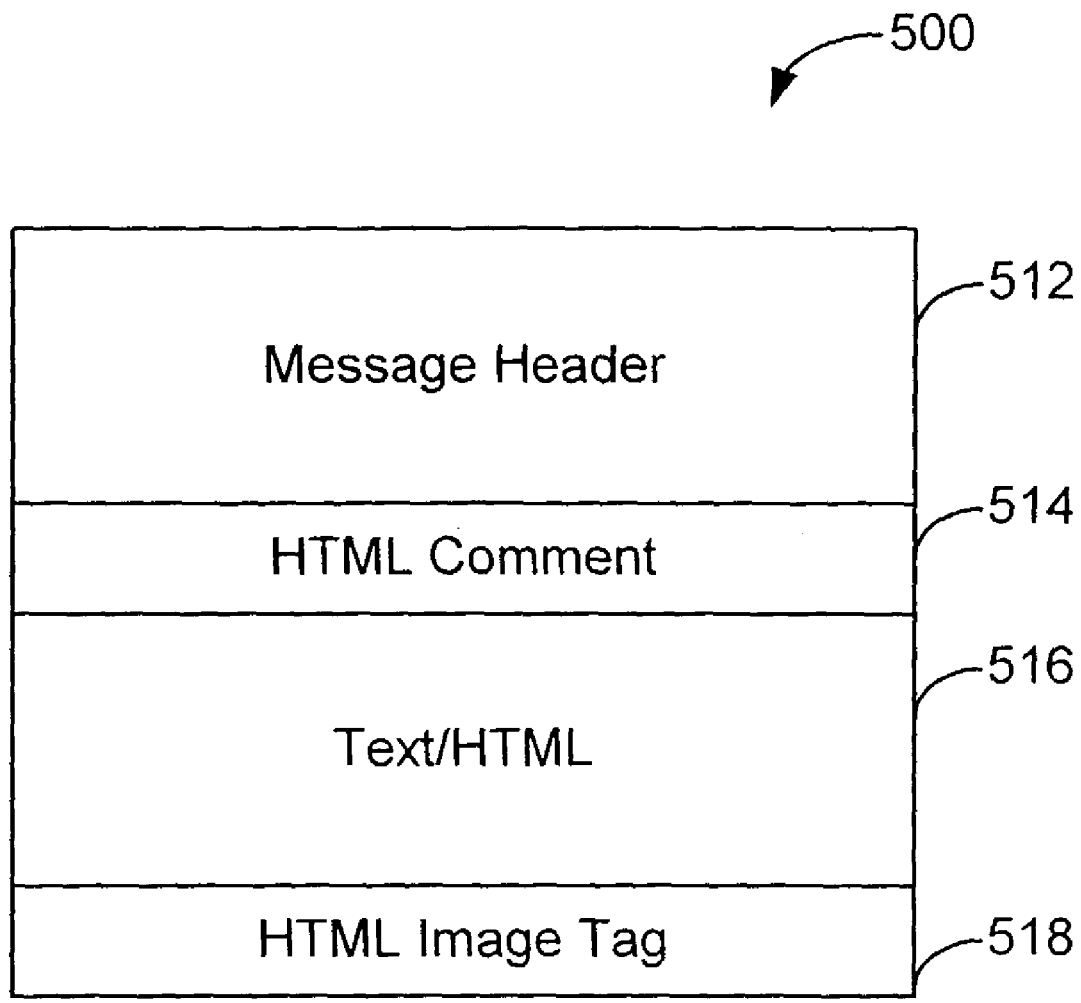
FIG. 5 shows the format of the second E-mail sensor message.

In a specific embodiment from node A (step 430), a second E-mail sensor message is prepared to be sent to the E-mail client. If the E-mail client can process and display HTML then FIG. 5 shows the format 500 of the second E-mail sensor message. FIG. 5A shows an example of a display of the second E-mail sensor message of format 500. Note that it contains more complicated HTML statements and visual images than the first E-mail sensor message. Format 500 is like format 300 of FIG. 3, except the Message Header 512 is of "Content-Type: text|html" and Text/Plain 312 is replaced by a HTML comment 514. An example of the message header 512 is:

message (step 550). The E-mail server 134 checks the E-mail sensor database 132 to determine if the E-mail client can process and display HTML (step 552). If the E-mail client is HTML enabled (step 554) then the E-mail server 134 sends the second E-mail sensor message of format 500 to the E-mail client 142 (step 556). If the user at the E-mail client display 212 can read the HTML comment 514, then the user sends an E-mail message to the E-mail address given in the HTML comment 514 to have subsequent messages sent with only pure text. The E-mail server 134 then updates the database 132 for this E-mail client. Otherwise, the E-mail server will continue to send E-mail messages of format 500. If the user at the E-mail client display 212 cannot read the HTML comment 514 then the E-mail client 142 displays the HTML part 516 of the E-mail message, and using the HTML image tag

```
Received: from gatekeeper.townsend.com
    ([10.1.31.150])
    by mailhub.townsend.com; Wed, 27 Jan 1999 18:26:37 -0800
Received: from ws23.digital-impact.tngi.com (ws23.digital-impact.tngi.com
[207.214.203.120])
    by gatekeeper.townsend.com (2.5 Build 2630 (Berkeley 8.8.6)/8.8.4) with ESMTP
        id SAA06538 for <kk@townsend.com>; Wed, 27 Jan 1999 18:23:32 -0800
Received: from appl.merchantmail.net (nobody@ws23.digital-impact.tngi.com
[207.214.203.120])
    by ws23.digital-impact.tngi.com (8.8.7/8.8.7) with SMTP id SAA05227
        for <kk@townsend.com>; Wed, 27 Jan 1999 18:24:43 -0800
Date: Wed, 27 Jan 1999 18:24:43 -0800
Message-Id: <199901280224.SAA05227@ws23.digital-impact.tngi.com>
From: Tower Records <tower@merchantmail.net>
Reply-to: Tower Records <tower@merchantmail.net>
To: kk@townsend.com
Subject: Super Clearance Sale
Errors-to: tower@merchantmail.net
Content-Type: text/html
X-cid: 32578156
Mime-version: 1.0
An example of the HTML comment 514 is:
    <!--<BR>
    ***********************************************************************<BR>
    NOTICE: If you can read this, we are sending you email with <BR>
    the wrong format. Sorry for the inconvenience. To insure that <BR>
    we get it right, please send an email to:<BR>
    <BR>
    nohtml@merchantmail.net <BR>
    <BR>
    You don't have to put anything special anywhere in the message. <BR>
    With your help, we can make sure your email is the best possible! <BR>
    ***********************************************************************<BR>
    <BR>
    -->
```

This HTML comment 514 is not displayed if the E-client can process and display HTML. If the first E-mail sensor was incorrect and the E-mail client cannot process or display HTML, then this comment is displayed. The user at the E-mail client sends an E-mail message to the E-mail server to have subsequent messages sent with only a format similar to the message header 310 and Text/Plain 312. In an alternative embodiment, the second E-mail sensor message would have format 500 of FIG. 5 without the HTML comment 514. And thus would assume the first E-mail sensor message was correct in determining that the E-mail client could process and display HTML.

In the specific embodiment, FIG. 6 shows sending a second E-mail message, including the E-mail sensor from the E-mail server 134 to the E-mail client 142. This second E-mail message is sent after the first E-mail sensor message. All subsequent E-mail messages will go through routine of FIG. 6. FIG. 6 starts at node A 430 which is a continuation from FIG. 4. The E-mail server first gets a request for another E-mail

518, reports the E-mail message status information back to the E-mail sensor server 130. The HTML image tag contains a call to the sensor server program stored on the E-mail sensor server 130. The sensor server program then updates the database 132 with, for example, the date and time the E-mail message was opened.

If the E-mail client is not HTML enabled (step 554) then the E-mail sensor server 130 again sends another E-mail sensor message of format 300 to the E-mail client 142 (step 558). The E-mail client then displays the plain text part 312 of the E-mail sensor message (step 560). In this case, although the HTML 314 and HTML image tag 316 portions of the E-mail sensor message may be displayed, they are typically unreadable. The E-mail client may continue to receive in subsequent messages, E-mail sensor messages of format 300.

E-Mail Sensor Server

Figure 7:
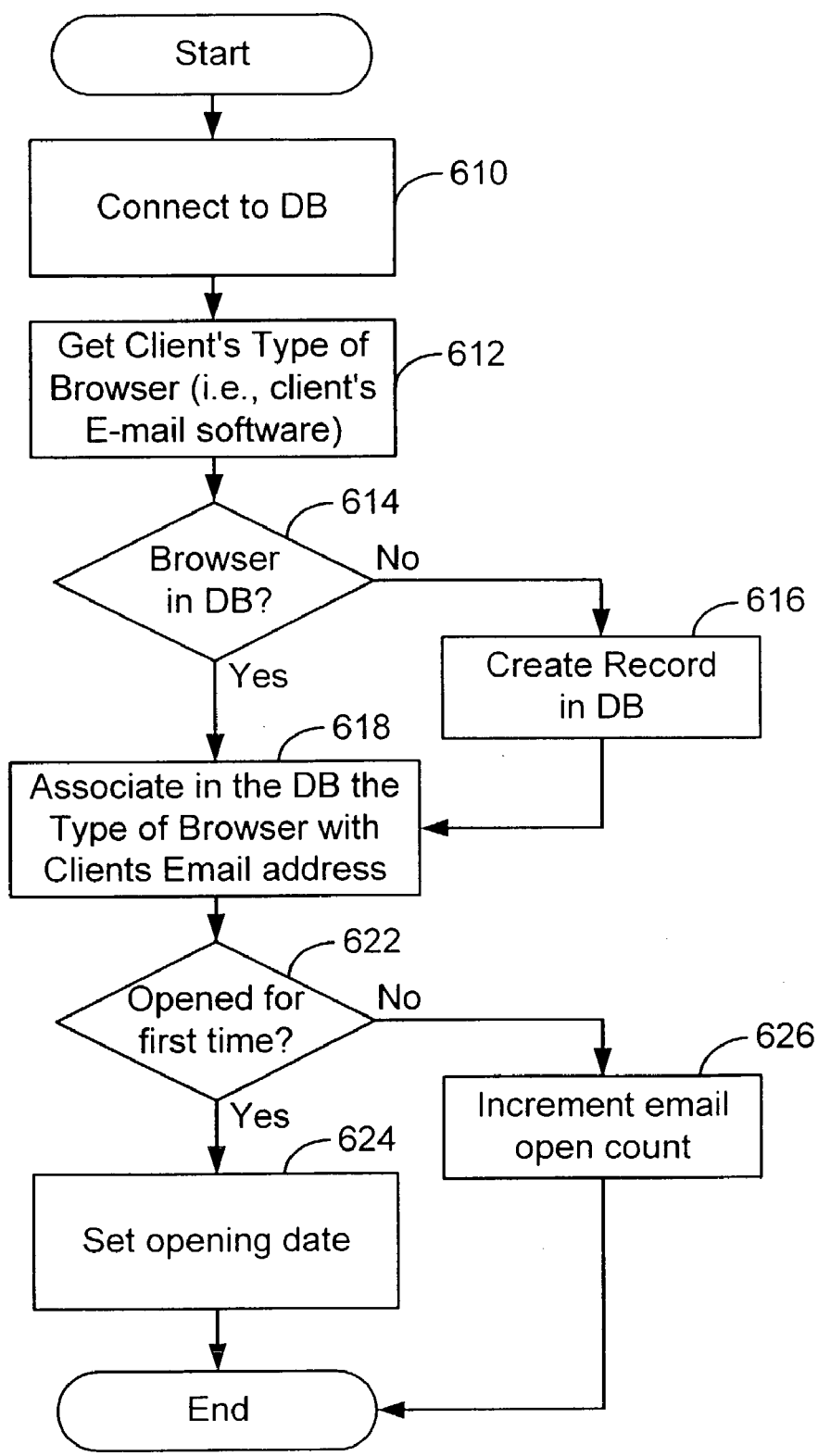
FIG. 7 shows a simplified specific embodiment of the E-mail sensor server.

FIG. 7 shows a simplified specific embodiment of the E-mail sensor server, when the E-mail client is HTML enabled. Upon receiving information from the HTML image tag 316 from the E-mail client 142, the E-mail sensor server 130 accesses the sensor database 132 (step 610). The E-mail sensor server 130 gets the type and version of E-mail client's software (step 612). If the E-mail client's software type is not in the E-mail sensor database 132 (step 614) then a new record is created in the sensor database 132 (step 616). This normally occurs when the E-mail sensor first executes the HTML image tag in an HTML enabled E-mail client 142. The type and version of the E-mail client's software, i.e., "browser-type", is sent as environmental variables from the E-mail client 142 to the E-mail sensor server program. This is then entered into the E-mail sensor database 132. If the browser type is in the sensor database (step 614) then the type of browser is associated with the E-mail client's E-mail address (step 618). Since the E-mail message at the client has been opened, the E-mail sensor server 130 then determines if the E-mail client's message has been opened for the first time (step 622). This typically occurs when the E-mail sensor is first received by an HTML enabled E-mail client 142 and the HTML image tag executed. If yes, then the E-mail sensor server sets the opening date and time in the E-mail sensor database 132 (step 624). If the E-mail message has been opened for a second or greater time (step 622) then an E-mail counter is incremented in the E-mail sensor database 132 (step 626). This typically occurs every time the E-mail client software re-opens the E-mail message and executes the HTML image tag which again calls the sensor server program on the E-mail sensor server 130 and increments the counter.

In another specific embodiment a JavaScript or Java applet could be used to monitor how long a time interval the E-mail message is open. The JavaScript or Java applet would run on the E-mail client and send to the E-mail sensor server when the E-mail message is opened and when it is closed. This time can then be used to calculate the interval the E-mail message was open and the time can be stored in the database 132. In another alternative embodiment the JavaScript or Java applet could poll the E-mail sensor server at predetermined intervals as long as the E-mail message is open. These polling times can then be used to calculate the interval the E-mail message was open and the time can be stored in the database 132.

As a specific example of the E-mail sensor server program, an example of a Visual Basic Script that runs on the E-mail sensor server 130 executing the flowchart of FIG. 7 is given below:

```
<%@LANGUAGE="VBSCRIPT"
        'disable caching
        Response.Expires = 0
%>
<OBJECT RUNAT=Server ID=oConn PROGID="ABODB.Connection"></OBJECT>
<!-- #include file="i_global01.asp" -->
<%
Call Main ( )
'-------------------------------------------------------------------------
Sub Main ( )
        Response.ContentType="image/JPG"
        If Request.QueryString("E-mail") = "" Then
                Call LogError("ERROR 534: No E-mail address passed: " +
Request.QueryString("E-mail"))
                Exit Sub
        End If
        oConn.open Session ("DIDB_ConnectionString")
        browserType = Request.ServerVariables("HTTP_User_Agent")
        If browserType = "" Then
                browserType = "HTML"
        End If
        Set getClientIdCmd = Server.CreateObject("ADODB.Command")
        getClientIdCmd.ActiveConnection = oConn
        getClientIdCmd.CommandType = 1
        getClientIdCmd.CommandText = "select em_client_id from E-mail_clients where name =
?"
        Set E-mailNameParm = getClientIdCmd.CreateParameter("E-mailparm", 8, 1)
        getClientIdCmd.Parameters.Append E-mailNameParm
             getClientIdCmd(0) = browserType
             Set oRs = getClientIdCmd.Execute
             If oRs.EOF Then
                   Set oRs = Server.CreateObject("ADODB.Recordset")
                   oRs.Open "E-mail_clients",oConn, 1, 3
                   oRs.AddNew
                   oRs("name") = browserType
                   oRs("html") = 1
                   oRs.Update
             End if
             E-mailId = oRs.Fields.Item("em_client_id")
             oRs.Close
             'Now update the E-mail address with the E-mail client type information
        Set updateE-mailMetaCmd = Server.CreateObject("ADODB.Command")
        updateE-mailMetaCmd.ActiveConnection = oConn
        updateE-mailMetaCmd.CommandType = 1
        updateE-mailMetaCmd.CommandText = "update member_E-mails set em_client_id = ?,
modified_on = getdate( ) where E-mail = ? and target_address = 1"
        Set clientIdParm = updateE-mailMetaCmd.CreateParameter("clientidparm", 2, 1)
        updateE-mailMetaCmd.Parameters.Append clientIdParm
        Set E-mailParm = updateE-mailMetaCmd.CreateParameter("E-mailparm", 8, 1)
        updateE-mailMetaCmd.Parameters.Append E-mailParm
             updateE-mailMetaCmd(0) = E-mailId
             updateE-mailMetaCmd(1) = Trim(Request.QueryString("E-mail"))
```

-continued

```
        updateE-mailMetaCmd.Execute
        'Log when the catalog was first opened and how many times since
        If Request.QueryString("catid") <> "" Then
                SQLQuery = "select opened,opened_count from catalogs where catalog_id =
" + Request.QueryString("catid")
                Set oRs = oConn.Execute(SQLQuery)
                If Not oRs.EOF Then
                        If oRs.Fields("opened").ActualSize = 0 Then
                                SQLQuery = "update catalogs set opened = getdate( ),
opened_count = 1 where catalog_id =" + Request.QueryString("catid")
                        Else
                                newCount = oRs.Fields("opened_count").Value + 1
                                If newCount > 255 Then newCount = 255
                                SQLQuery = "update catalogs set opened_count = " +
CStr(newCount) + " where catalog_id = " + Request.QueryString("catid")
                        End If
                        oRs.Close
                        On Error Resume Next
                        Set oRs = oConn.Execute(SQLQuery)
                        If Err.Number <> 0 Then
                                Call LogError("ERROR 532: Could not updated when
catalog was opened: " + Request.QueryString("catid"))
                        End If
                        oRs.Close
                Else
                        Call LogError("ERROR 533: Could not locate catalog information: "
+ Request.QueryString("catid"))
                End If
                oRs.Close
        End If
        Response.BinaryWrite Application("IMG_CONTENT")
End Sub
'------------------------------------------------------------------------
%>
```

When the HTML image tag is executed at the E-mail client 142, a request is made to a computer located at Internet address "sensorserver.domain.com" to run program "sensor server program" with parameters "E-mail address" and "unique mail code". In this specific example, the internet address "sensorserver.domain.com" is for the E-mail sensor server 130, the "sensor server program" is that given in the visual basic script above, the "E-mail address" is that of E-mail client 142, and the "unique mail code" is "X-cid: 10424522" as given in the example of the E-mail sensor message above.

The sensor server program in shown above, updates three relational database tables. Table 1 illustrates three simplified sensor database tables that may be stored in E-mail sensor database 132. The "E-MAIL_CLIENTS" table has the type of the E-mail client software that E-mail client 142 uses to display the HTML E-mail. This type is stored in "name". The "E-mail address" parameter identifying the E-mail client 142, is stored in "E-mail" in the "MEMBER_E-MAILS" table. In the "CATALOGS" table: the "unique E-mail code" is stored in "catalog-id;" (in the E-mail sensor message example above, catalog id=10424522); the date and time the E-mail client first opens the E-mail message is stored in "opened"; and the count of number of times the E-mail message is opened is stored in "open_count".

TABLE 1

| CATALOGS TABLE | | | MEMBER_E-MAILS TABLE | | | E-MAIL_CLIENTS TABLE | | |
|---|---|---|---|---|---|---|---|---|
| Column Name | Type | Length | Column Name | Type | Length | Column Name | Type | Length |
| catalog_id | int | 4 | member_id | int | 4 | em_client_id | smallint | 2 |
| campaign_id | int | 4 | E-mail | varchar | 250 | name | char | 250 |
| member_id | int | 4 | low_E-mail | varchar | 250 | ms_dhtml | bit | 1 |
| catalog_type | char | 1 | em_client_id | smallint | 2 | ns_dhtml | bit | 1 |
| catalog_url | char | 64 | modified_on | smalldatetime | 4 | inline_images | bit | 1 |
| status | tinyint | 1 | target_address | bit | 1 | html | bit | 1 |
| mailed | datetime | 8 | valid | bit | 1 | browser_based | bit | 1 |
| opened | datetime | 8 | bounced_cnt | tinyint | 1 | | | |
| opened_count | tinyint | 1 | last_bounced | smalldatetime | 4 | | | |
| bounced_ent | tinyint | 1 | mp_override | bit | 1 | | | |
| | | | domain | varchar | 250 | | | |

CONCLUSION

In the foregoing specification, the invention has been described with reference to specific exemplary embodiments thereof. Other embodiments will be apparent to those of ordinary skill in the art. For example, the E-mail sensor message format may include DHTML rather than HTML, the Email sensor server program may be written in Java, C++ or Perl rather than Visual Basic script, or the E-mail sensor may include Active X or JavaScript to determine if visual images and text can be displayed. Thus, it is evident that various

What is claimed is:

1. A method of sending and tracking E-mail messages, the method comprising:
sending an E-mail message to an E-mail client over a public network, the E-mail message including a statement identifying an image, wherein the image is not included in the E-mail message;
receiving, over the public network, a response from the E-mail client requesting the image when the E-mail message is opened at the E-mail client and the statement is automatically processed by the E-mail client as a result of the opening of the E-mail message, the response including information identifying the E-mail message sent to the E-mail client; and
responsive to receiving the response, storing information indicating that the E-mail message was opened at the E-mail client.

2. The method of claim 1 wherein:
the E-mail message sent to the E-mail client comprises a first identifier uniquely identifying the E-mail message; and
the information identifying the E-mail message received from the E-mail client includes the first identifier.

3. The method of claim 1 wherein the E-mail sent to the E-mail client is addressed to a recipient E-mail address, and the response from the E-mail client comprises information identifying the recipient E-mail address.

4. The method of claim 1 wherein a response is received from the E-mail client each time that the E-mail message is opened at the E-mail client, the method further comprising:
storing a count indicating a number of times the E-mail message is opened at the E-mail client.

5. The method of claim 1 wherein the response received from the E-mail client further comprises information identifying a type and a version of a program used to open the E-mail message on the E-mail client, the method further comprising:
storing the type and version of the program.

6. The method of claim 1 wherein the statement is a mark up language statement.

7. The method of claim 6 wherein the mark up language is hyper text mark up language (HTML).

8. The method of claim 6 wherein the mark up language is dynamic hyper text mark up language (DHTML).

9. The method of claim 1 wherein the image identified by the statement is a 1×1 pixel image.

10. The method of claim 1 wherein the public network is the Internet.

11. A method of sending and tracking E-mail messages, the method comprising:
sending an E-mail message to an E-mail client over a communication network, the E-mail message comprising a statement identifying an applet, wherein the applet is not included in the E-mail message;
receiving, over the public network, a response from the E-mail client requesting the applet when the E-mail message is opened at the E-mail client and the statement is automatically processed by the E-mail client as a result of the opening of the E-mail message, the response comprising information identifying the E-mail message sent to the E-mail client; and
upon receiving the response, storing information indicating that the E-mail message was opened at the E-mail client.

12. The method of claim 11 wherein:
the E-mail message sent to the E-mail client includes a first identifier uniquely identifying the E-mail message; and
the response received from the E-mail client comprises the first identifier.

13. The method of claim 11 wherein the E-mail message is addressed to a recipient E-mail address and the response received from the E-mail client comprises information identifying the recipient E-mail address.

14. The method of claim 11 wherein the statement is a java object tag.

15. The method of claim 14 wherein the statement identifies an Uniform Resource Locator (URL) for downloading the applet.

16. A method of sending and tracking E-mails, the method comprising:
sending an E-mail to an E-mail client, the E-mail including a statement identifying a resource, wherein the resource is not included in the E-mail message;
receiving a message from the E-mail client requesting the resource when the E-mail message is opened at the E-mail client and the statement is automatically processed by the E-mail client as a result of the opening of the E-mail message; and
responsive to receiving the message, storing information indicating that the E-mail was opened at the E-mail client.

17. The method of claim 16 wherein the statement is a markup language statement and the resource is an applet.

18. The method of claim 17 wherein the message received from the E-mail client comprises information indicating whether the E-mail client is capable of executing the applet.

19. The method of claim 16 wherein the resource is an image.

20. The method of claim 19 wherein the image is a 1×1 pixel image.

21. The method of claim 16 wherein the statement is a markup language statement.

22. The method of claim 21 wherein the mark up language is hyper text mark up language (HTML).

23. The method of claim 21 wherein the mark up language is dynamic hyper text mark up language (DHTML).

24. The method of claim 16 wherein the E-mail is a multi-purpose internet mail extensions (MIME) compliant E-mail.

25. The method of claim 16 wherein the message received from the E-mail client comprises information identifying the E-mail sent to the E-mail client.

26. The method of claim 25 wherein:
the E-mail sent to the E-mail client includes an identifier identifying the E-mail message; and
the message received from the E-mail client comprises the identifier.

27. The method of claim 16 wherein the E-mail is addressed to a recipient E-mail address and the message received from the E-mail client comprises information identifying the recipient E-mail address.

28. The method of claim 16 wherein the statement is a markup language statement, the method further comprising storing, responsive to receiving the message from the E-mail client, information indicating that the E-mail client can process the markup language.

29. The method of claim 16 wherein storing the information indicating that the E-mail was opened at the E-mail client comprises:

storing information identifying a date the E-mail was first opened at the E-mail client.

30. The method of claim 16 wherein a message is received from the E-mail client each time that the E-mail is opened at the E-mail client, the method further comprising:

storing a count indicating a number of times the E-mail is opened at the E-mail client.

31. The method of claim 16 wherein the message received from the E-mail client comprises information identifying a type and a version of a program used to open the E-mail on the E-mail client.

32. A computer program product stored on a non-transitory computer-readable medium for sending and tracking E-mail messages, the computer program product comprising:

code for sending an E-mail message to an E-mail client, the E-mail message including a statement identifying an image, wherein the image is not included in the E-mail message;

code for receiving a response from the E-mail client requesting the image when the E-mail message is opened at the E-mail client and the statement is automatically processed by the E-mail client as a result of the opening of the E-mail message, the response including information identifying the E-mail message sent to the E-mail client; and code for storing, upon receiving the response, information indicating that the E-mail message was opened at the E-mail client.

33. The computer program product of claim 32 wherein the E-mail message sent to the E-mail client is addressed to a recipient E-mail address and the response comprises information identifying the recipient E-mail address.

34. The computer program product of claim 32 wherein a response is received from the E-mail client each time that the E-mail message is opened at the E-mail client, the computer program product further comprising code for storing a count indicating a number of times the E-mail message is opened at the E-mail client.

35. A computer program product stored on a non-transitory computer-readable medium for sending and tracking E-mail messages, the computer program product comprising:

code for sending an E-mail message to an E-mail client over a public network, the E-mail message comprising a statement identifying an applet, wherein the applet is not included in the E-mail message;

code for receiving a response from the E-mail client requesting the applet when the E-mail message is opened at the E-mail client and the statement is automatically processed by the E-mail client as a result of the opening of the E-mail message, the response comprising information identifying the E-mail message sent to the E-mail client; and code for storing, upon receiving the response, information indicating that the E-mail message was opened at the E-mail client.

36. The computer program product of claim 35 wherein the E-mail message sent to the E-mail client is addressed to a recipient E-mail address and response comprises information identifying the recipient E-mail address.

37. The computer program product of claim 35 wherein the statement identifies an Uniform Resource Locator (URL) for downloading the applet.

38. The computer program product of claim 35 wherein a response is received from the E-mail client each time that the E-mail message is opened at the E-mail client, the computer program product further comprising code for storing a count indicating a number of times the E-mail message is opened at the E-mail client.

39. A computer program product stored on a non-transitory computer-readable medium for sending and tracking E-mail messages, the computer program product comprising:

code for sending an E-mail message to an E-mail client, the E-mail message including a statement specifying a resource, wherein the resource is not included in the E-mail message;

code for receiving a response from the E-mail client requesting the resource when the E-mail message is opened at the E-mail client and the statement is automatically processed by the E-mail client as a result of the opening of the E-mail message; and code for storing, responsive to receiving the response, information indicating that the E-mail message was opened at the E-mail client.

40. The computer program product of claim 39 wherein the statement is an object tag statement and the resource is a Java applet.

41. The computer program product of claim 39 wherein the statement is an image tag statement and the resource is an image.

42. The computer program product of claim 39 wherein the image is a 1×1 pixel image.

43. The computer program product of claim 39 wherein the response received from the E-mail client comprises information identifying the E-mail message sent to the E-mail client.

44. The computer program product of claim 39 further comprising code for storing, responsive to receiving the response from the E-mail client, information indicating that the E-mail client can process the mark up language.

45. The computer program product of claim 39 wherein the code for storing the information indicating that the E-mail message was opened at the E-mail client comprises code for storing information identifying a date the E-mail message was first opened at the E-mail client.

46. The computer program product of claim 39 wherein a response is received from the E-mail client each time that the E-mail message is opened at the E-mail client, the computer program product further comprising code for storing a count indicating a number of times the E-mail message is opened at the E-mail client.

47. The computer program product of claim 39 wherein the statement is a mark up language statement.

48. The computer program product of claim 47 wherein the mark up language is hyper text mark up language (HTML).

49. The computer program product of claim 47 wherein the mark up language is dynamic hyper text mark up language (DHTML).

50. A computer system for sending and tracking E-mail messages, the computer system comprising:

a processor; and a memory coupled to the processor, the memory configured to store a plurality of code modules for execution by the processor, the plurality of code modules comprising:

a code module for sending an E-mail to an E-mail client, the E-mail including a statement identifying a resource, wherein the resource is not included in the E-mail message;

a code module for receiving a message from the E-mail client requesting the resource when the E-mail is opened at the E-mail client and the statement is automatically processed by the E-mail client as a result of the opening of the E-mail message; and a code module for storing, responsive to receiving the message, information indicating that the E-mail was opened at the E-mail client.

51. The computer system of claim 50 wherein the resource is an applet.

52. The computer system of claim 50 wherein the resource is an image.

53. The computer system of claim 50 wherein the statement is a markup language statement.

54. The system of claim 53 wherein the plurality of code modules comprises a code module for storing, responsive to receiving the message from the E-mail client, information indicating that the E-mail client can process the markup language.

55. The system of claim 53 wherein the markup language is hyper text mark up language (HTML).

56. The computer system of claim 50 wherein the plurality of code modules comprises a code module for storing a count indicating a number of times the E-mail is opened at the E-mail client.

57. The computer system of claim 50 wherein the message received from the E-mail client comprises information identifying the E-mail.

58. The computer system of claim 50 wherein the E-mail sent to the E-mail client is addressed to a recipient E-mail address and the message received from the E-mail client comprises information identifying the recipient E-mail address.

* * * * *